R. H. KOENIG.
FOLDABLE MOTOR CYCLE SEAT.
APPLICATION FILED MAY 8, 1915.
1,178,649.
Patented Apr. 11, 1916.
2 SHEETS—SHEET 1.
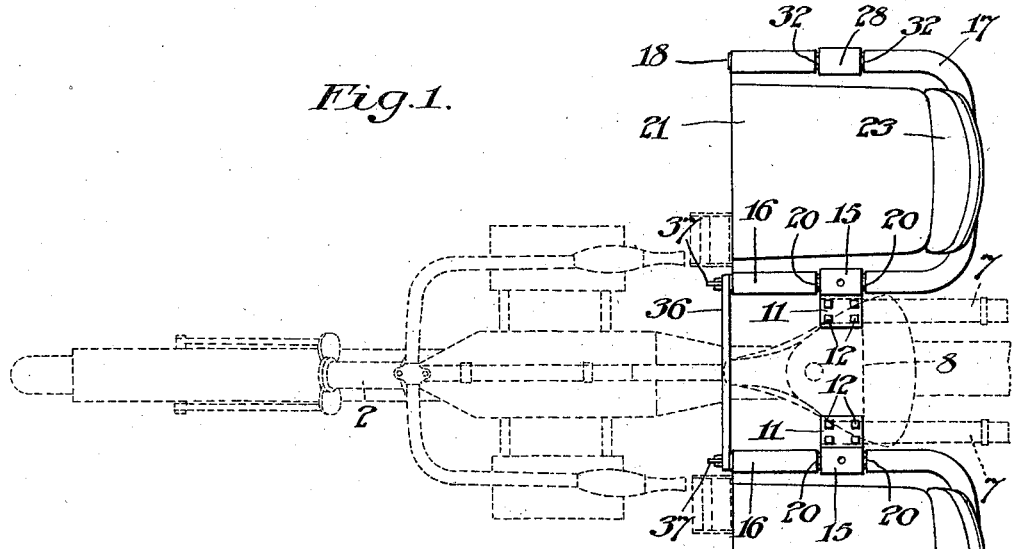
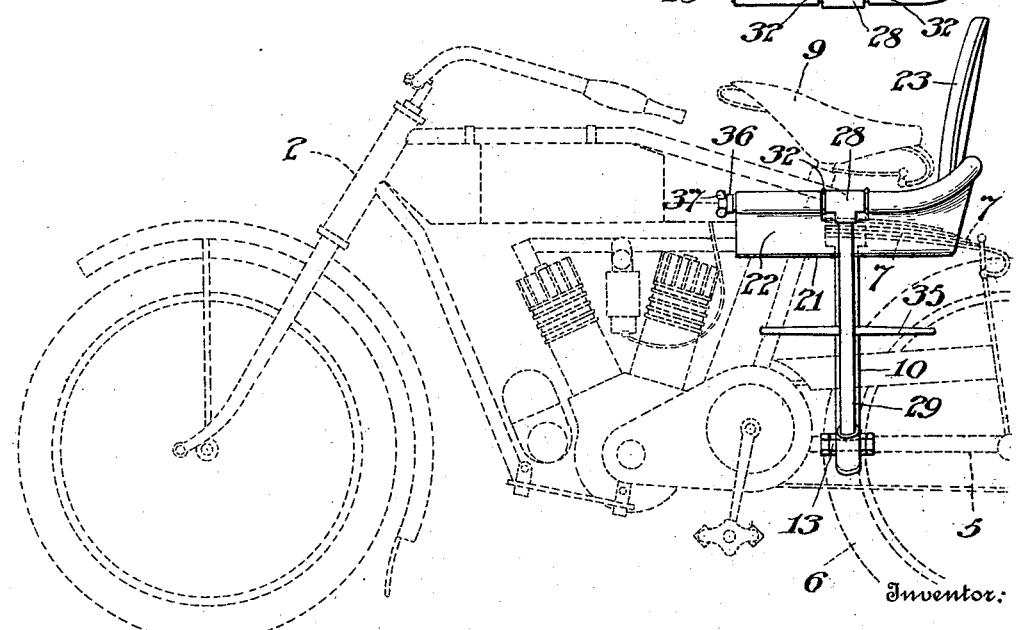
Inventor:
Robert H. Koenig,
By
Attorney R. H. KOENIG.
FOLDABLE MOTOR CYCLE SEAT.
APPLICATION FILED MAY 8, 1915.
1,178,649.
Patented Apr. 11, 1916.
2 SHEETS—SHEET 2.
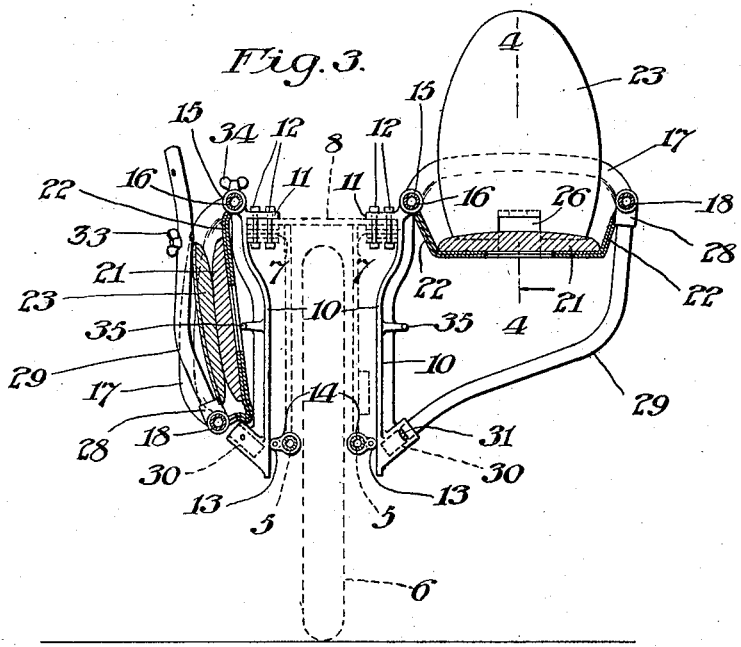
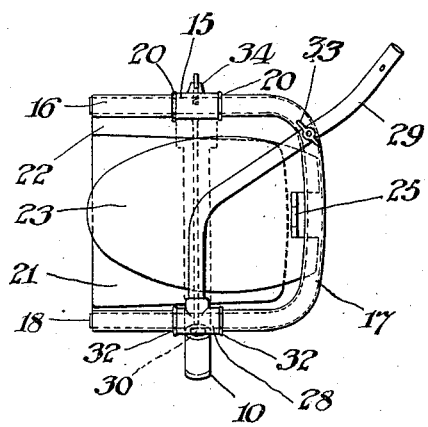
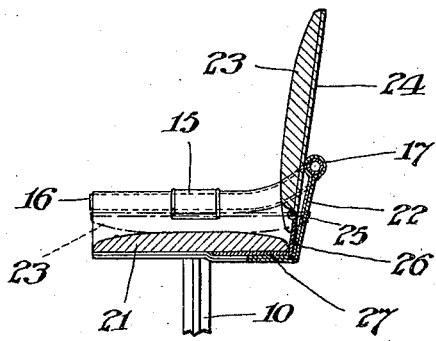
Inventor,
Robert H. Koenig,
By
Attorney

UNITED STATES PATENT OFFICE.

ROBERT H. KOENIG, OF CAMDEN, NEW JERSEY, ASSIGNOR OF ONE-HALF TO JAMES S. MONCRIEFF, OF CAMDEN, NEW JERSEY.

FOLDABLE MOTOR-CYCLE SEAT.

1,178,649.   Specification of Letters Patent.   Patented Apr. 11, 1916.

Application filed May 8, 1915. Serial No. 26,703.

*To all whom it may concern:*

Be it known that I, ROBERT H. KOENIG, a citizen of the United States, residing at Camden, in the county of Camden and State of New Jersey, have invented certain new and useful Improvements in Foldable Motor-Cycle Seats, of which the following is a specification.

My invention relates to improvements in seats of the turn seat type for motor cycles, my object being to provide a novel, simple and efficient seat structure which may be readily folded into a compact inoperative and unfolded into an operative position and supported in the operative position for use, the seat or seats extending laterally from the side or sides of the motor cycle when supported in the operative position and lying close to the side or sides of the motor cycle when folded into the inoperative position.

With this object in view my invention consists in the novel construction and combinations of parts hereinafter fully described and claimed.

In the accompanying drawings, illustrating my invention, Figure 1 is a plan view of a portion of a motor cycle provided with seats embodying my invention, the seats being shown by full lines and the motor cycle being shown by dotted lines. Fig. 2 is a side view thereof. Fig. 3 is a transverse vertical section, through the seat structure, showing one seat structure in the open operative position and showing another seat structure in the folded, compact, inoperative position. Fig. 4 is a vertical section through one of the seats, on line 4—4 of Fig. 3, showing the back rest folded down upon the seat proper, by dot-and-dash lines. Fig. 5 is a side elevation, showing one of the seat structures in the folded, inoperative position.

Referring to the drawings, 2 designates a motor cycle to which my improved seat structure is applied. The motor cycle herein shown is of a well known type and it includes in its construction a pair of side bars 5 laterally of the rear wheel 6, a pair of springs 7 above the side bars 5 and having their forward ends connected by a member 8 forming part of the frame which supports the saddle 9, the member 8 and forward ends of the springs 7 being movable toward and from the side bars 5 by the action of the springs 7 in yieldingly supporting the saddle 9 and other parts of the motor cycle.

My improved twin seat arrangement includes two similar seat structures one located on one side and one located on the other side of the motor cycle 2; and, therefore, a description of one seat structure will suffice for both as follows: Adjacent to the outer side of the spring 7 and side bar 5 on one side of the motor cycle 2 is a vertically extending frame member 10 having a flange 11 extending inwardly from the upper portion thereof and over the adjacent side of the cycle frame member 8 and spring 7. The flange 11 is secured to the adjacent cycle frame member 8 and the forward end of the adjacent spring 7 by bolts 12 which also serve to secure the spring 7 and member 8 together. The lower portion of the frame member 10 rests against an anti-friction roller 13 carried by a bracket 14 which is secured to the adjacent side bar 5 of the motor cycle. Thus the adjacent side bar 5 takes the inward thrust of the lower end of the frame member 10, while the member 10 is permitted to move up and down with the forward end of the spring 7 during the travel of the motor cycle 2.

The upper end portion of the frame member 10 has a horizontally-extending bearing member 15 formed thereon, and mounted to turn in this bearing 15 is the inner arm 16 of a U-shaped seat member 17 which is thus hinged to the frame member 10 and which comprises the inner arm 16, an outer arm 18 and a rear part connecting the arms 16 and 18. Longitudinal displacement of the arm 16 within the bearing 15 is prevented by suitable cotter pins 20 extending through the arm 16 adjacent to the ends of the bearing 15. This seat member 17 extends around the sides and back of a seat proper 21 which is suitably upholstered and supported by canvas or other suitable flexible material 22 extending downwardly from the seat member 17. The canvas or other material 22 is doubled around the seat member 17, and the double material is sewed together immediately below the member 17 and then extended downwardly to and beneath the seat 21 and is tacked or otherwise suitably secured to the bottom of the seat 21. The seat 21 is provided with a back rest 23 which comprises an upholstered metal plate 24 hinged, at 25 to the top of the upwardly-extending arm 26 of a bracket or angle piece 27 which extends between the canvas or material 22 and the seat 21 and is secured to the bottom of the seat 21. The back rest 23 is adapted to be folded on the hinge 25 from the operative position, shown by full lines, to the inoperative position, down upon the seat 21, as shown by dot-and-dash lines in Fig. 5.

Hinged on the outer arm 18 of the seat member 17 is a T-piece or bracket 28 into which the upper end of a brace 29 is screwed. The brace 29 extends from the arm 18 to the lower portion of the frame member 10 and has its lower end inserted into an opening or socket 30 in the member 10, the end of the brace 29 being retained in the socket in the member 10 by a removable cotter pin 31 extending therethrough. Longitudinal displacement of the T-piece or bracket 28 upon the arm 18 is prevented by cotter pins 32 extending through the arm 18.

When the seat structure is in the open, operative position shown in Figs. 1, 2 and the right hand side of Fig. 3, the seat member 17 and its seat 21 extend outwardly from the upper portion of the frame member 10 and they are supported in this position by the brace 29. When it is desired to fold the structure in the inoperative position, shown in the left hand side of Fig. 3 and in Fig. 4, the back rest 23 is folded on the hinge 25 down upon the seat 21, the cotter pin 31 is removed and the lower end of the brace 29 is withdrawn from the socket 30 of the frame member 10. The seat member 17, carrying the seat 21 and back rest 23, is then lowered on its hinge and the lower end of the brace 29 is moved outwardly and then upwardly on the hinge connecting the brace 29 with the arm 18, the brace 29 is turned slightly in the bracket or T-piece 28 and the parts are brought into the folded inoperative position, as shown. In this position of the parts the seat 21 and its back rest 23 are inclosed between the frame member 10 and the brace 29 which is secured in the folded position by a thumb screw 33 extending through an opening in the brace 29 and screwed into the seat member 17. The seat member 17 is secured in the folded position by a thumb screw 34 which extends through the bearing 15 and is screwed into the arm 16 of the seat member 17.

I preferably provide the frame member 10 with a pair of outwardly extending arms 35 adapted to brace the seat 21 when it is in the inoperative position. I also preferably provide a suitable brace bar 36 extending between the forward ends of the inner arms 16 of the two seat structures and secured thereto by means of suitable thumb screws 37.

I claim:

1. The combination with a motor cycle, of a frame member, means to secure the frame member to the upper portion of the motor cycle, a seat member laterally of the motor cycle and having its inner side hinged to said frame member and being adapted to be moved on its hinge from an outwardly extending operative position to a downwardly extending inoperative position, and means to support said seat in its operative position.

2. The combination with a motor cycle, of a vertically-extending frame member having its upper portion secured to the upper portion of the motor cycle and having its lower portion supported by the lower portion of the motor cycle, a seat member laterally of the motor cycle and having its inner side hinged to the upper portion of said frame member and being adapted to be moved on its hinge from an outwardly-extending operative position to a downwardly-extending inoperative position, and a brace movable from an inoperative position to an operative position extending between the lower portion of said frame member and the outer portion of said seat member and supporting said seat member in the operative position, said brace when moved from the operative position permitting said seat member to be moved to the inoperative position.

3. The combination with a motor cycle, of a vertically-extending frame member having its upper portion secured to the upper portion of the motor cycle and having its lower portion supported by the lower portion of the motor cycle, a seat member laterally of the motor cycle and having its inner side hinged to the upper portion of said frame member and being adapted to be moved on its hinge from an outwardly-extending operative position to a downwardly-extending inoperative position, and a brace adapted to extend from the lower portion of said frame member to the outer portion of said seat member when in its operative position, said brace being hinged to one of said members and detachably connected to the other of said members when in the operative position, whereby said seat member and said brace may be moved on their hinges to an inoperative position.

4. The combination with a motor cycle, of a vertically-extending frame member having its upper portion secured to the upper portion of the motor cycle and having its lower portion supported by the lower portion of the motor cycle, a seat member laterally of the motor cycle and having its inner side hinged to the upper portion of said frame member and being adapted to be moved on its hinge from an outwardly-extending operative position to a downwardly-extending inoperative position, a brace hinged to the outer portion of said seat member and extending downwardly and inwardly therefrom to the lower portion of said frame member, and means to detachably connect said brace to said frame member, whereby said seat member and said brace may be moved on their hinges to an inoperative position.

5. The combination with a motor cycle, of a frame member, means to secure the frame member to the motor cycle, a seat member pivotally connected to said frame member, and a brace pivotally connected to one of said members and detachably connected to the other of said members and adapted to support said seat member in an operative position, said seat member being foldable to a compact inoperative position between said frame member and said brace.

6. The combination with a motor cycle, of a frame member, means to secure the frame member to the motor cycle, a seat member pivotally connected to said frame member and having a seat provided with a back rest hinged thereto and foldable upon said seat, and a brace pivotally connected to one of said members and detachably connected to the other of said members and adapted to support said seat member in an operative position, said seat member and its seat and said back rest being foldable to a compact inoperative position between said frame member and said brace.

7. The combination with a motor cycle, of a frame member, means to secure the frame member to the motor cycle, and a seat member movably connected to said frame member and having a seat provided with a back rest hinged thereto and foldable upon said seat, said seat member with said back rest folded upon its seat being foldable with respect to said frame member into a compact inoperative position.

8. The combination with a motor cycle, of a frame member, means to secure the frame member to the motor cycle, a U-shaped seat member provided with a seat and comprising an inner arm hinged to said frame member, an outer arm and a rear part connecting said arms, said seat member being adapted to be moved on its hinge from an outwardly-extending operative position to a downwardly-extending inoperative position, and a brace connecting said members and hinged to one of them and adapted to support said seat member in the operative position.

9. The combination with a motor cycle, of a frame member, means to secure the frame member to the motor cycle, a U-shaped seat member provided with a seat and comprising an inner arm hinged to said frame member, an outer arm and a rear part connecting said arms, said seat member being adapted to be moved on its hinge from an outwardly-extending operative position to a downwardly-extending inoperative position, and a back rest hinged to said seat and foldable upon the same, and means to support said seat member in the operative position.

10. The combination with a motor cycle, of a frame member, means to secure the frame member to the motor cycle, a U-shaped seat member provided with a seat and comprising an inner arm hinged to said frame member, an outer arm and a rear part connecting said arms, said seat member being adapted to be moved on its hinge from an outwardly-extending operative position to a downwardly-extending inoperative position, a back rest hinged to said seat and foldable upon the same, and a brace connecting said members and hinged to one of them and adapted to support said seat member in the operative position, said brace being movable on its hinge to an inoperative position wherein said seat and said back rest are inclosed between it and said frame member.

In testimony whereof I affix my signature in presence of two witnesses.

ROBERT H. KOENIG.

Witnesses:
S. I. HARPER,
A. V. GROUPE.